United States Patent
Koseki et al.

(10) Patent No.: US 9,985,567 B2
(45) Date of Patent: May 29, 2018

(54) ELECTRIC MOTOR DRIVE DEVICE AND CONTROL METHOD THEREFOR

(71) Applicant: Hitachi Automotive Systems, Ltd., Hitachinaka-shi, Ibaraki (JP)

(72) Inventors: Tomonobu Koseki, Isesaki (JP); Tomishige Yatsugi, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/107,747

(22) PCT Filed: Dec. 10, 2014

(86) PCT No.: PCT/JP2014/082754
§ 371 (c)(1),
(2) Date: Jun. 23, 2016

(87) PCT Pub. No.: WO2015/098537
PCT Pub. Date: Jul. 2, 2015

(65) Prior Publication Data
US 2016/0329853 A1 Nov. 10, 2016

(30) Foreign Application Priority Data
Dec. 25, 2013 (JP) ................... 2013-266434

(51) Int. Cl.
*H02P 25/022* (2016.01)
*H02P 27/08* (2006.01)
(Continued)

(52) U.S. Cl.
CPC ............ *H02P 27/08* (2013.01); *H02P 25/022* (2013.01); *H02P 27/06* (2013.01); *H02P 29/68* (2016.02)

(58) Field of Classification Search
CPC .................................. H02P 27/08; H02P 29/68
See application file for complete search history.

(56) References Cited

U.S. PATENT DOCUMENTS 5,825,150 A * 10/1998 Kachi ................ G05B 19/4062
318/271
7,759,888 B2 * 7/2010 Matsui ................ H02H 7/0805
318/400.29
(Continued)

FOREIGN PATENT DOCUMENTS

| JP | 7-33342 A | 2/1995 |
|---|---|---|
| JP | 9-93984 A | 4/1997 |

(Continued)

OTHER PUBLICATIONS

Japanese-language Office Action issued in counterpart Japanese Application No. 2013-266434 dated Nov. 29, 2016 with English translation (7 pages).
(Continued)

*Primary Examiner* — Shawki S Ismail
*Assistant Examiner* — Muhammad S Islam
(74) *Attorney, Agent, or Firm* — Crowell & Moring LLP

(57) ABSTRACT

The present invention relates to an electric motor drive device where a first inverter and a second inverter both supply power to one electric motor and to a control method for the electric motor drive device. A control unit for controlling an output of each inverter increases an output of the inverter of which a drive control system has first completed an initial diagnosis, ahead of the other inverter. If either inverter is about to overheat, the control unit decreases an output of the inverter that is about to overheat while keeping or increasing an output of the other inverter having the normal temperature.

13 Claims, 6 Drawing Sheets

(51) Int. Cl.
*H02P 27/06* (2006.01)
*H02P 29/68* (2016.01)

(56) References Cited

U.S. PATENT DOCUMENTS

| | | | |
|---|---|---|---|
| 2010/0050703 A1* | 3/2010 | Maekawa | D06F 25/00 68/23 R |
| 2011/0156627 A1* | 6/2011 | Nakamura | B62D 5/0403 318/400.22 |
| 2011/0163708 A1 | 7/2011 | Mukai et al. | |
| 2011/0315470 A1 | 12/2011 | Uryu | |
| 2011/0316466 A1* | 12/2011 | Uryu | B62D 5/0484 318/490 |
| 2012/0032622 A1* | 2/2012 | Lipo | H02P 21/0089 318/400.27 |
| 2012/0187893 A1* | 7/2012 | Baba | H02P 25/021 318/722 |
| 2013/0271056 A1 | 10/2013 | Buente et al. | |
| 2014/0035498 A1* | 2/2014 | Harbourt | H02P 6/14 318/400.26 |

FOREIGN PATENT DOCUMENTS

| | | |
|---|---|---|
| JP | 2614788 B2 | 5/1997 |
| JP | 2009-131021 A | 6/2009 |
| JP | 2011-142744 A | 7/2011 |
| JP | 2012-25374 A | 2/2012 |
| JP | 2013-38950 A | 2/2013 |

OTHER PUBLICATIONS

International Search Report (PCT/ISA/210) issued in PCT Application No. PCT/JP2014/082754 dated Feb. 24, 2015 with English-language translation (four (4) pages).
Japanese-language Written Opinion (PCT/ISA/237) issued in PCT Application No. PCT/JP2014/082754 dated Feb. 24, 2015 (six (6) pages).
International Preliminary Report on Patentability (PCT/IB/326, PCT/IB/338 & PCT/IB/373) issued in PCT Application No. PCT/JP2014/082754 dated Jul. 7, 2016, including English Translation of document C2 (Japanese-language Written Opinion (PCT/ISA/237)) previously filed on Jun. 23, 2016 (10 pages).

* cited by examiner

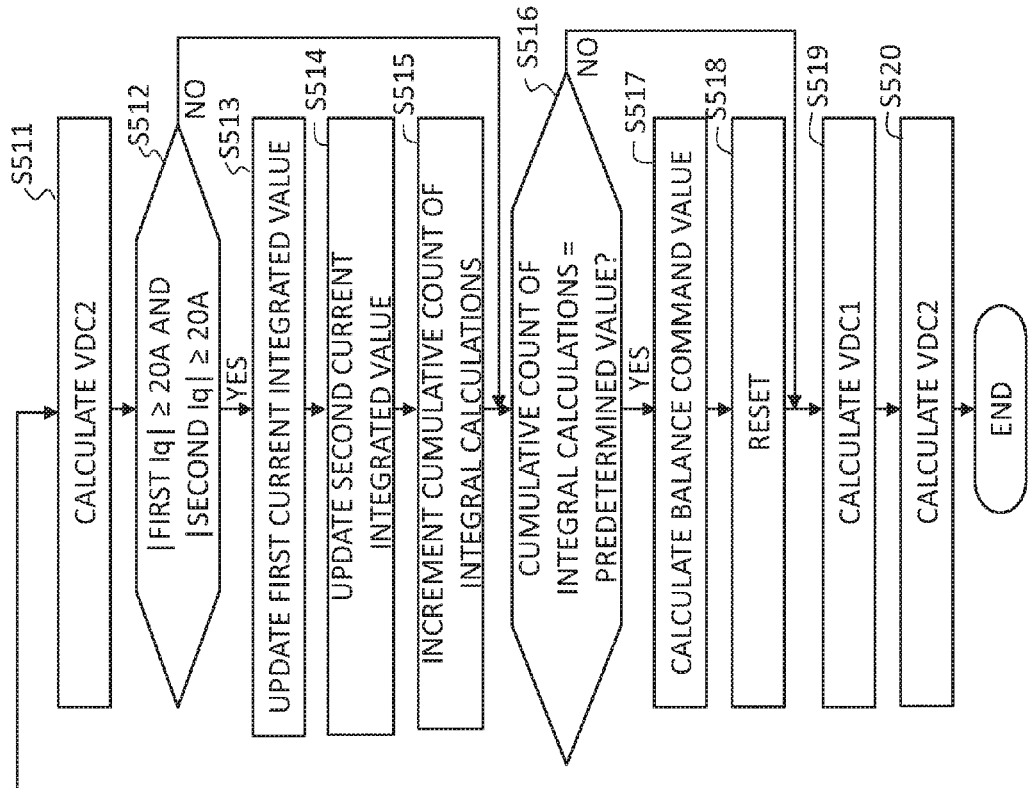
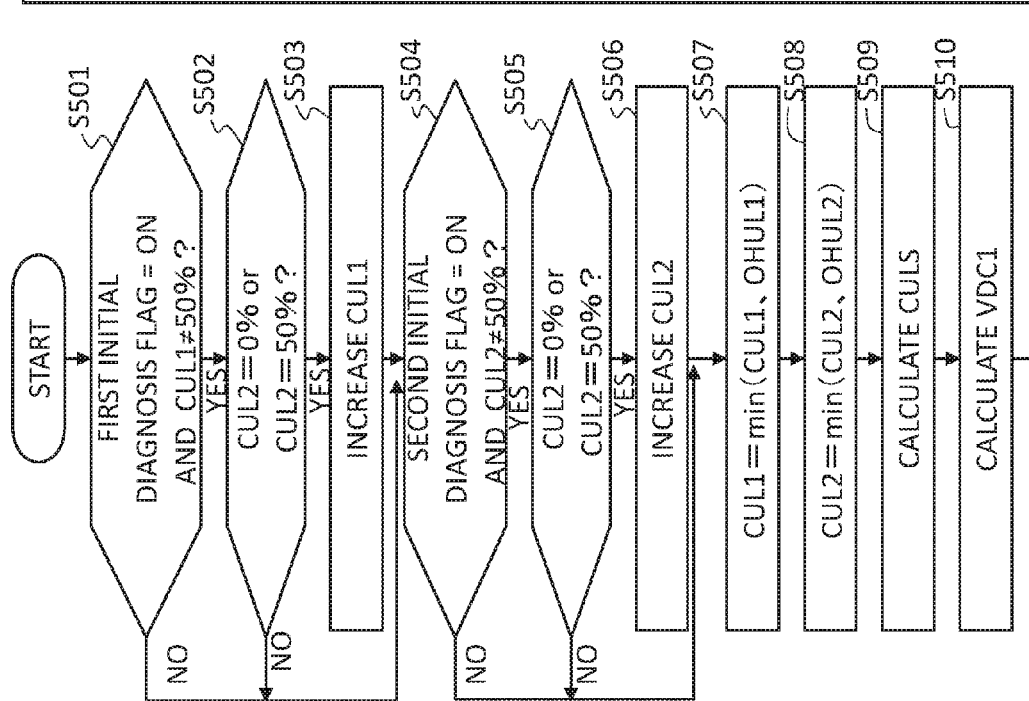

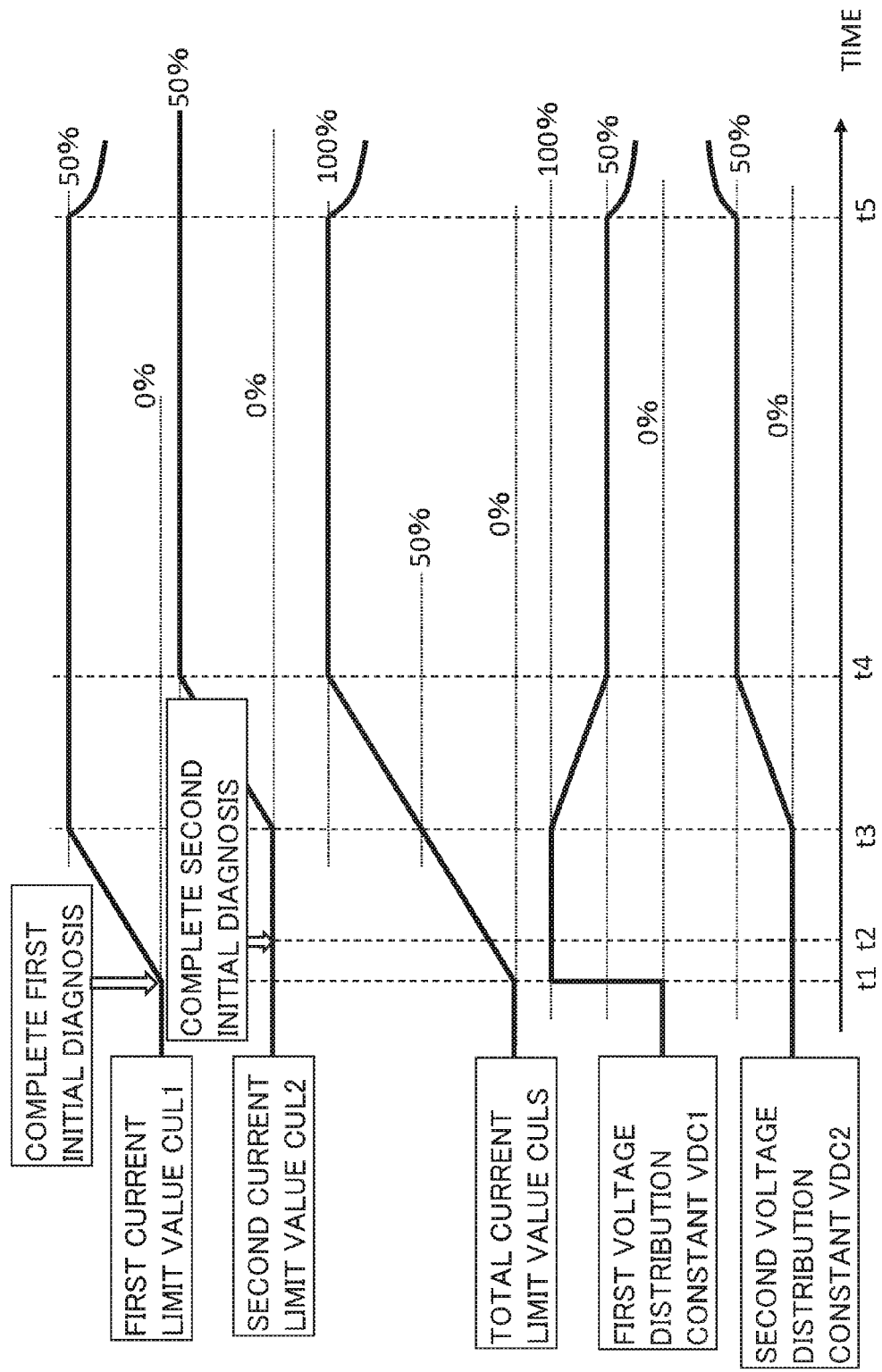

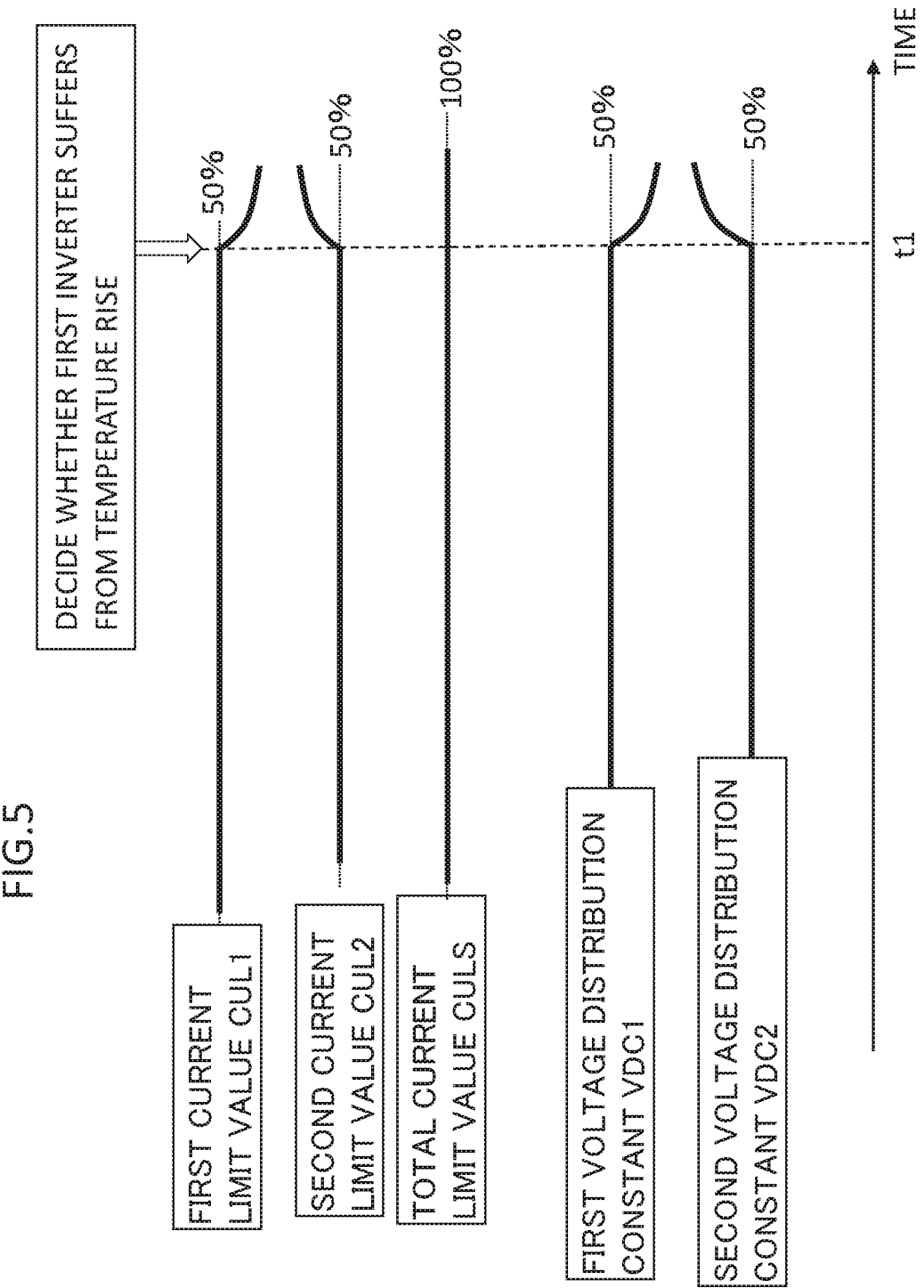

ELECTRIC MOTOR DRIVE DEVICE AND CONTROL METHOD THEREFOR

TECHNICAL FIELD

The present invention relates to an electric motor drive device that supplies power to one electric motor from both of a first inverter and a second inverter and to a control method for such electric motor drive device.

BACKGROUND ART

Patent Document 1 discloses that a controller of a multiphase AC motor uses an average value of output currents of plural inverters connected, in parallel, to the multiphase AC motor, as a feedback signal sent to a main current control system provided on a rotating coordinate system of the AC motor, and uses a differential value of output currents of the respective inverters as a feedback signal sent to a current control system for controlling unbalanced currents which is provided on the rotating coordinate system of the AC motor.

REFERENCE DOCUMENT LIST

Patent Document

Patent Document 1: Japanese Patent No. 2614788

SUMMARY OF THE INVENTION

Problems to be Solved by the Invention

In conventional electric motor drive devices for supplying power to one electric motor from both of a first inverter and a second inverter, an output ratio between the inverters is fixed. Thus, when initial diagnosis is executed on drive control systems for both inverters, for example, at the startup of the electric motor, even if either one of the control systems completes its diagnosis ahead of the other, the electric motor cannot start until both systems complete their diagnoses. This leads to a problem that the electric motor starts with some delay.

Another problem is that, if either one of the inverters suffers from abnormal heat generation, both inverters have to lower their outputs together, resulting in a considerable reduction in the output torque of the electric motor.

Still another problem is as follows. That is, in an electric motor which generates a steering assist force in an electric power steering device, if the startup is delayed, steering assist (power assist) cannot start immediately. If the output torque of the electric motor decreases due to the abnormal heat generation in either inverter, a driver would have to control the steering more strongly.

The present invention has been accomplished in view of at least some of the above problems and an object of the present invention is to enhance the drive control performance for an electric motor in an electric motor drive device that supplies power to one electric motor from both of a first inverter and a second inverter.

Means for Solving the Problems

To achieve the above object, the present invention provides an electric motor drive device provided with a first inverter and a second inverter, both of which supply power to one electric motor, the device comprising a control unit configured to change an output ratio between the first inverter and the second inverter under a predetermined condition.

Furthermore, the present invention provides a control method for an electric motor drive device provided with a first inverter and a second inverter, both of which supply power to one electric motor, the control method comprising the steps of: deciding whether a predetermined condition for changing an output ratio between the first inverter and the second inverter is satisfied; and changing the output ratio between the first inverter and the second inverter under the predetermined condition.

Effects of the Invention

According to the present invention, it is possible to increase/decrease an output of either one of the first inverter and the second inverter relative to the other and hence to enhance the drive control performance of the electric motor.

BRIEF DESCRIPTION OF THE DRAWINGS

FIG. 3 is a flowchart illustrating the processing for setting an output ratio between a first inverter and a second inverter according to the embodiment of the present invention.

FIG. 4 is a timing chart illustrating an example of how to change the output ratio between the first inverter and the second inverter according to the embodiment of the present invention.

FIG. 5 is a timing chart illustrating an example of how to change the output ratio between the first inverter and the second inverter according to the embodiment of the present invention.

MODE FOR CARRYING OUT THE INVENTION

Figure 1:
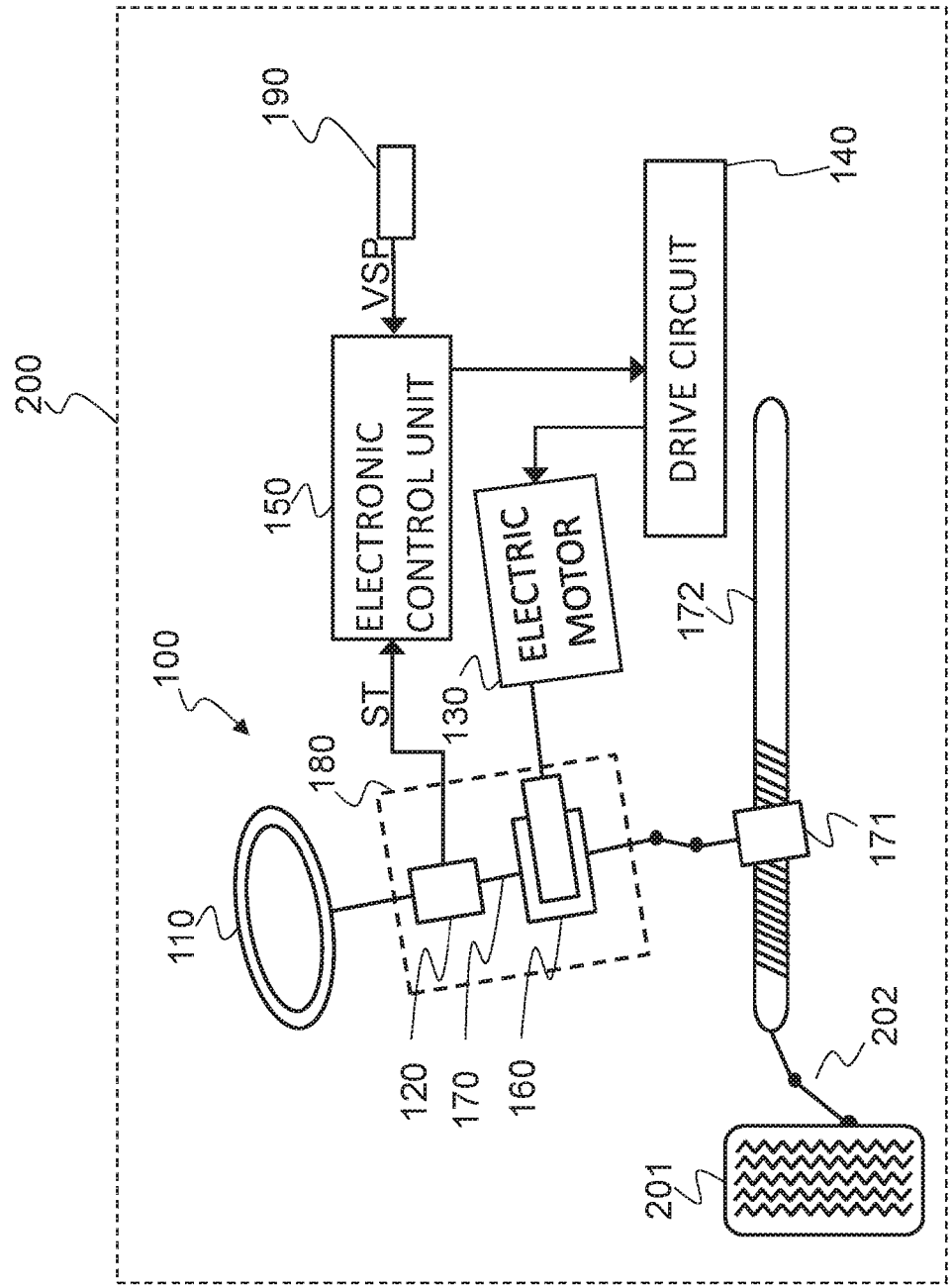
FIG. 1 is a schematic diagram of an electric power steering device that employs an electric motor drive device according to an embodiment of the present invention.

Hereinafter, an embodiment of the present invention will be described. FIG. 1 illustrates an electric motor drive device according to the embodiment of the present invention. In the illustrated example of FIG. 1, the electric motor drive device is applied to an electric motor that generates a steering assist force in an in-vehicle electric power steering device.

In FIG. 1, an electric power steering device 100 is installed in a vehicle 200, and serves to generate a steering assist force by use of an electric motor 130.

Electric power steering device 100 is composed of, for example, a steering wheel 110, a steering torque sensor 120, electric motor 130, a drive circuit 140 including an inverter, an electronic control unit 150, and a speed reducer 160 that reduces the rotational speed of electric motor 130 and then transmits the torque to a pinion shaft of a steering shaft 170.

Steering torque sensor 120 and speed reducer 160 are disposed within a steering column 180 accommodating steering shaft 170.

A pinion gear 171 is provided at the tip end of steering shaft 170. Along with the rotation of pinion gear 171, a rack gear 172 is horizontally moved to the left or right along the travelling direction of vehicle 200. Rack gear 172 is provided, at both ends, with a steering mechanism 202 for each wheel 201, and wheel 201 can change its direction according to the horizontal movement of rack gear 172.

Steering torque sensor 120 measures a steering torque that is generated in steering shaft 170 during the driver's steering operation, and then outputs a signal ST representing the measured steering torque to electronic control unit 150.

Electronic control unit 150 incorporating a microcomputer receives the steering torque signal ST, a vehicle speed signal VSP output from a vehicle speed sensor 190, or other such information about state variable for calculating the steering assist force.

Electronic control unit 150 controls drive circuit 140 based on the steering torque signal ST, the vehicle speed signal VSP, or other such signals representing driving conditions of the vehicle to thereby control a torque generated by electric motor 130, i.e., steering assist force.

Note that in the illustrated example of FIG. 1, electronic control unit 150 and drive circuit 140 constitute the electric motor drive device for driving electric motor 130, but electronic control unit 150 may incorporate drive circuit 140. In this case, electronic control unit 150 incorporating drive circuit 140 constitutes the electric motor drive device.

Figure 2:
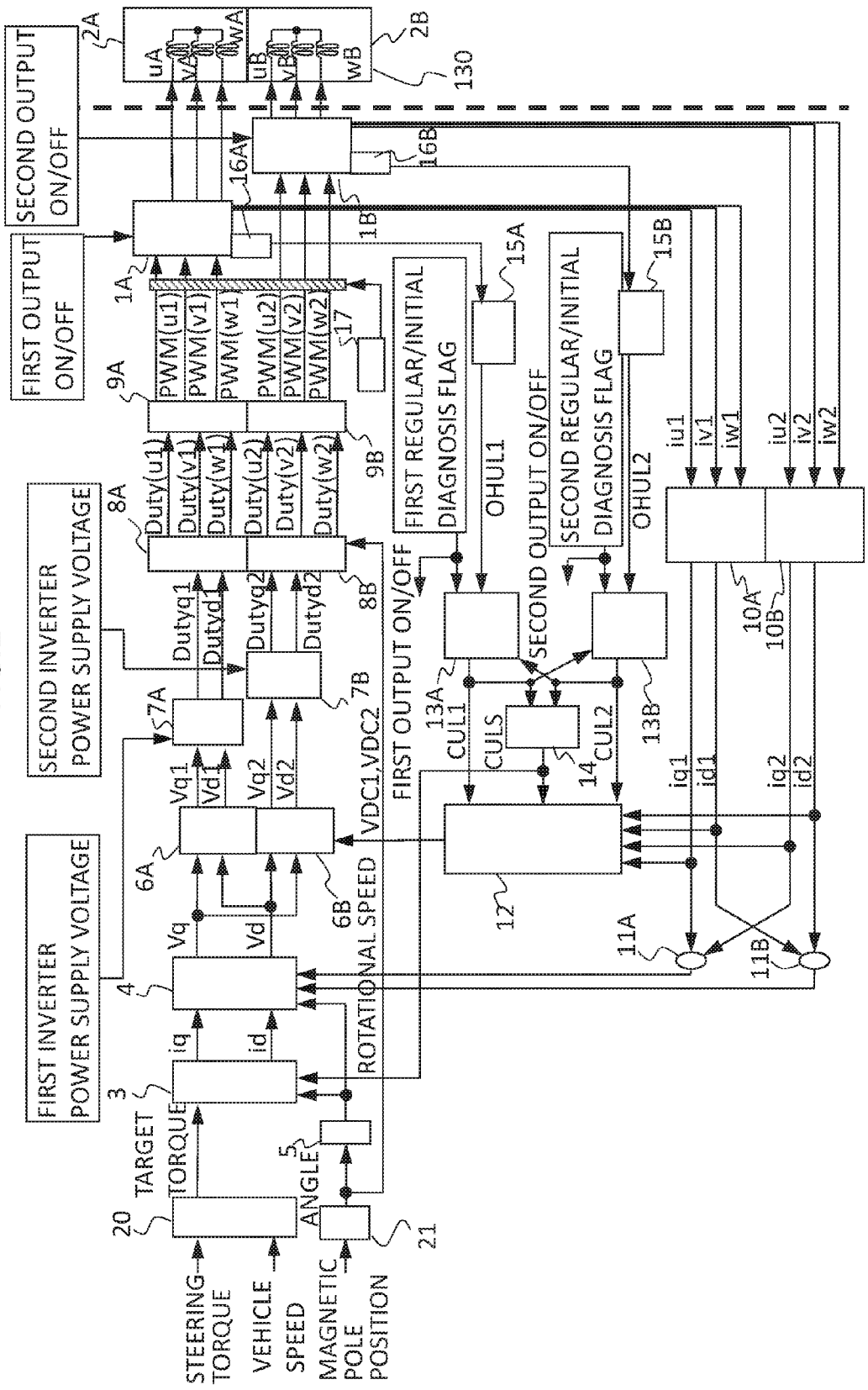
FIG. 2 is a functional block diagram of the electric motor drive device according to the embodiment of the present invention.

FIG. 2 is a functional block diagram illustrating an example of control functions of electronic control unit 150.

In FIG. 2, drive circuit 140 includes a first inverter 1A and a second inverter 1B, and first inverter 1A and second inverter 1B both supply power to one electric motor 130.

Electric motor 130 is a three-phase synchronous electric motor composed of a first winding set 2A of star-connected three-phase windings UA, VA, and WA and a second winding set 2B of star-connected three-phase windings UB, VB, and WB. First winding set 2A and second winding set 2B share a magnetic circuit.

Moreover, first winding set 2A is directly connected to first inverter 1A, and second winding set 2B is directly connected to second inverter 1B. First inverter 1A supplies power to first winding set 2A, and second inverter 1B supplies power to second winding set 2B.

Note that first inverter 1A incorporates a first current sensor that measures a current flowing in windings UA, VA, and WA of first winding set 2A, and second inverter 1B incorporates a second current sensor that measures a current flowing in windings UB, VB, and WB of second winding set 2B.

A target assist torque calculation unit 20 calculates target assist torque, that is, a target value of an output torque from electric motor 130 based on a vehicle speed or a torque value measured by steering torque sensor 120, which corresponds to a steering force that a driver applies to the steering wheel.

An angle calculation unit 21 receives an output signal from a magnetic pole position sensor that detects a magnetic pole angle of electric motor 130 and then calculates a magnetic pole angle. An electric motor rotational speed calculation unit 5 calculates the rotational speed of electric motor 130 based on information about the magnetic pole angle and then outputs a signal indicative of the rotational speed to a target current value calculation unit 3 and an output voltage calculation unit 4.

Target current value calculation unit 3 receives data on the target assist torque and data on the rotational speed of electric motor 130, and then calculates a d-axis current command value $I_d^*$ and a q-axis current command value $I_q^*$ based on these data and outputs the calculated values.

Output voltage calculation unit 4 receives the d-axis current command value $I_d^*$ and the q-axis current command value $I_q^*$, which are output from target current value calculation unit 3 and a d-axis actual current value $I_d$ and a q-axis actual current value $I_q$, which are respectively measured from outputs of current sensors incorporated in inverters 1A and 1B and also receives the data on the rotational speed of electric motor 130.

Output voltage calculation unit 4 executes feedback control by calculating a d-axis voltage command value $V_d$ and a q-axis voltage command value $V_q$ so as to approximate the d-axis actual current value $I_d$ to the d-axis current command value $I_d^*$ and approximate the q-axis actual current value $I_q$ to the q-axis current command value $I_q^*$ and then outputting the calculated values.

More specifically, output voltage calculation unit 4 calculates the d-axis voltage command value $V_d$ and the q-axis voltage command value $V_q$ based on the electric motor model equation for vector control so as to minimize differences between the d-axis actual current value $I_d$ and the d-axis current command value $I_d^*$ and between the q-axis actual current value $I_q$ and the q-axis current command value $I_q^*$.

The d-axis voltage command value $V_d$ and the q-axis voltage command value $V_q$ output from output voltage calculation unit 4 are input to a first voltage dividing unit 6A and a second voltage dividing unit 6B, respectively.

First voltage dividing unit 6A receives the d-axis voltage command value $V_d$ and the q-axis voltage command value $V_q$, and also receives a first voltage distribution constant VDC1(%) corresponding to an output rate of first inverter 1A and then, outputs a d-axis voltage command value $V_d 1$ and a q-axis voltage command value $V_q 1$ for first winding set 2A.

In addition, second voltage dividing unit 6B receives the d-axis voltage command value $V_d$ and the q-axis voltage command value $V_q$ and also receives a second voltage distribution constant VDC2(%) corresponding to an output rate of second inverter 1B and then outputs a d-axis voltage command value $V_d 2$ and a q-axis voltage command value $V_q 2$ for second winding set 2B.

Here, the total sum of the first voltage distribution constant VDC1 and the second voltage distribution constant VDC2 equals 100%. Provided that "first voltage distribution constant VDC1=second voltage distribution constant VDC2=50%", "d-axis voltage command value $V_d 1$=d-axis voltage command value $V_d 2$" and "q-axis voltage command value $V_q 1$=q-axis voltage command value $V_q 2$". In this case, an output ratio between first inverter 1A and second inverter 1B is "50%:50%".

The d-axis voltage command value $V_d 1$ and the q-axis voltage command value $V_q 1$ output from first voltage dividing unit 6A are input to a first output duty calculation unit 7A.

First output duty calculation unit 7A calculates a d-axis duty Dutyd1 and a q-axis duty Dutyq1, which are defined by PWM (Pulse Width Modulation) control on first inverter 1A, based on the d-axis voltage command value $V_d 1$, the q-axis voltage command value $V_q 1$, and a power supply voltage of first inverter 1A, and then outputs the calculated values.

Moreover, the d-axis voltage command value $V_d 2$ and the q-axis voltage command value $V_q 2$ output from second voltage dividing unit 6B are input to a second output duty calculation unit 7B.

Second output duty calculation unit 7B calculates a d-axis duty Dutyd2 and a q-axis duty Dutyq2, which are defined by PWM control on second inverter 1B based on the d-axis voltage command value $V_d2$, the q-axis voltage command value $V_q2$, and a power supply voltage of second inverter 1B and then outputs the calculated values.

A first two-to-three phase converting unit 8A receives the d-axis duty Dutyd1 and the q-axis duty Dutyq1, which are output from first output duty calculation unit 7A, and information about the magnetic pole position of electric motor 130. First two-to-three phase converting unit 8A calculates duty command values DutyU1, DutyV1, and DutyW1 for three phases of first winding set 2A based on these input values, and then outputs the calculated values.

Furthermore, a second two-to-three phase converting unit 8B receives the d-axis duty Dutyd2 and the q-axis duty Dutyq2, which are output from second output duty calculation unit 7B, and information about the magnetic pole position of electric motor 130. Second two-to-three phase converting unit 8B calculates duty command values DutyU2, DutyV2, and DutyW2 for three phases of second winding set 2B based on these input values, and then outputs the calculated values.

Note that the output ratio between the first inverter 1A and the second inverter 1B can be changed by correcting the duty command values output from two-to-three phase converting units 8A and 8B.

As in the configuration illustrated in FIG. 2, however, if the output ratio is changed by correcting signals that will be input to two-to-three phase converting units 8A and 8B, it is possible to control the output ratio with high accuracy even though the windings of electric motor 130 have different phases.

A first dead time compensation unit 9A receives the duty command values DutyU1, DutyV1, and DutyW1 output from first two-to-three phase converting unit 8A. Then, first dead time compensation unit 9A executes dead time compensation to recalculate the duty command values DutyU1, DutyV1, and DutyW1, and outputs the resultant values.

Moreover, a second dead time compensation unit 9B receives the duty command values DutyU2, DutyV2, and DutyW2 output from second two-to-three phase converting unit 8B. Then, second dead time compensation unit 9B executes dead time compensation to recalculate the duty command values DutyU2, DutyV2, and DutyW2, and outputs the resultant values.

The dead time compensation refers to processing for suppressing voltage drop etc. occurring with dead time voltage during PWM control that delays, by the dead time, the rising edge of a PWM signal indicating a result of comparing a triangular wave with a command value so as not to shortcut upper and lower arms of inverters 1A and 1B to generate a gate signal.

First inverter 1A receives the duty command values DutyU1, DutyV1, and DutyW1 output form first dead time compensation unit 9A.

Following the duty command values DutyU1, DutyV1, and DutyW1, in first inverter 1A, switching semiconductor devices constituting upper and lower arms for each phase are driven, whereby currents flowing in windings UA, VA, and WA of first winding set 2A come under PWM control.

In addition, second inverter 1B receives the duty command values DutyU2, DutyV2, and DutyW2 output from second dead time compensation unit 9B.

Following the duty command values DutyU2, DutyV2, and DutyW2, in second inverter 1B, switching semiconductor devices constituting upper and lower arms for each phase are driven, whereby currents flowing in windings UB, VB, and WB of second winding set 2B come under PWM control.

Currents iu1, iv1, and iw1 flowing in windings UA, VA, and WA of first winding set 2A are measured by a first current sensor incorporated in first inverter 1A. The measurement result is input to a first three-to-two phase converting unit 10A. First three-to-two phase converting unit 10A converts the currents iu1, iv1, and iw1 into a d-axis actual current value $I_d1$ and a q-axis actual current value $I_q1$, and then outputs the converted values.

Moreover, currents iu2, iv2, and iw2 flowing in windings UB, VB, and WB of second winding set 2B are measured by a second current sensor incorporated in second inverter 1B. The measurement result is input to a second three-to-two phase converting unit 10B. Second three-to-two phase converting unit 10B converts the currents iu2, iv2, and iw2 into a d-axis actual current value $I_d2$ and a q-axis actual current value $I_q2$, and then outputs the converted values.

A first adder 11A adds the d-axis actual current value $I_d1$ output from first three-to-two phase converting unit 10A and the d-axis actual current value $I_d2$ output from second three-to-two phase converting unit 10B and then outputs the resultant value to output voltage calculation unit 4 as a d-axis actual current value $I_d$ of electric motor 130.

Furthermore, a second adder 11B adds the q-axis actual current value $I_q1$ output from first three-to-two phase converting unit 10A and the q-axis actual current value $I_q2$ output from second three-to-two phase converting unit 10B and then outputs the resultant value to output voltage calculation unit 4 as a q-axis actual current value $I_q$ of electric motor 130.

A voltage distribution constant calculation unit 12 receives the d-axis actual current value $I_d1$ and the q-axis actual current value $I_q1$, which are output from first three-to-two phase converting unit 10A, the d-axis actual current value $I_d2$ and the q-axis actual current value $I_q2$, which are output from second three-to-two phase converting unit 10B, a first current limit value CUL1 output from a first current limit value calculation unit 13A, and a second current limit value CUL2 output from a second current limit value calculation unit 13B, and also receives total current limit value CULS output from a total current limit value calculation unit 14.

Then, voltage distribution constant calculation unit 12 calculates a first voltage distribution constant VDC1 that defines an output rate for first inverter 1A and a second voltage distribution constant VDC2 that defines an output rate for second inverter 1B based on these input signals, and then outputs the first voltage distribution constant VDC1 to first voltage dividing unit 6A and the second voltage distribution constant VDC2 to second voltage dividing unit 6B.

First current limit value calculation unit 13A receives a first current limit value OHUL1(%) for suppressing the risk of overheating, which is output from a first anti-overheat logic unit 15A, and signals indicative of a first initial diagnosis flag and a first regular diagnosis flag. Second current limit value calculation unit 13B receives an anti-overheat second current limit value OHUL2(%) output from a second anti-overheat logic unit 15B and signals indicative of a second initial diagnosis flag and a second regular diagnosis flag.

First anti-overheat logic unit 15A receives an output signal from a first temperature sensor 16A that measures the temperature of first inverter 1A, and second anti-overheat logic unit 15B receives an output signal from a second temperature sensor 16B that measures the temperature of second inverter 1B.

Then, first anti-overheat logic unit 15A and second anti-overheat logic unit 15B set current limit values OHUL1 and OHUL2 to avoid overheating in first inverter 1A and second inverter 1B according to the temperature levels of first inverter 1A and second inverter 1B. The current limit values correspond to upper limits of the output rates.

In other words, in order to limit the current down to a lower value relative to the temperature rise in first inverter 1A and second inverter 1B, first anti-overheat logic unit 15A and second anti-overheat logic unit 15B correct to lower values, the limit value OHUL1 that defines an upper limit of the current for first inverter 1A and the limit value OHUL2 that defines an upper limit of the current for second inverter 1B in case of the temperature rise in inverters 1A and 1B.

The first initial diagnosis flag and the second initial diagnosis flag are set ON at the completion of initial diagnosis on a drive control system for each inverter, which is executed at the startup of electric motor 130.

Note that the drive control system includes inverters 1A and 1B and control units for inverters 1A and 1B, but the initial diagnosis can be executed on at least one of inverters 1A and 1B and the control units for inverters 1A and 1B.

The initial diagnosis is carried out under the condition that the output from inverters 1A and 1B is shutdown to suspend electric motor 130, aiming at deciding whether various types of computing functions are normally implemented and various types of devices can normally operate.

In addition, executed as the initial diagnosis are failure diagnosis on the first drive control system, which aims at deciding whether a failure occurs in at least one of first inverter 1A and the first control unit for controlling the output from first inverter 1A, and failure diagnosis on the second drive control system, which aims at deciding whether a failure occurs in at least one of second inverter 1B and the second control unit for controlling an output from second inverter 1B.

Note that the first control unit includes from first voltage dividing unit 6A to first dead time compensation unit 9A, and second control unit includes from second voltage dividing unit 6B to second dead time compensation unit 9B.

A first initial diagnosis flag is held at an initial value, 0 (OFF) until the completion of the initial diagnosis on the first drive control system. If any failure is not detected through the initial diagnosis on the drive control system for first inverter 1A, the flag is switched up to 1 (ON).

Likewise, a second initial diagnosis flag is held at an initial value, 0 (OFF) until the completion of the initial diagnosis on the second drive control system. If any failure is not detected through the initial diagnosis on the drive control system for second inverter 1B, the flag is switched up to 1 (ON).

A first regular diagnosis flag and a second regular diagnosis flag each indicate a result of diagnosis on the drive control system after the startup of electric motor 130. The first regular diagnosis flag is held at 1 (ON) if the drive control system for first inverter 1A normally operates, whereas the flag is switched down to 0 (OFF) if any abnormality occurs. Likewise, the second regular diagnosis flag is held at 1 (ON) if the drive control system for second inverter 1B normally operates, whereas the flag is switched down to 0 (OFF) if any abnormality occurs.

Signals indicative of the first initial diagnosis flag and the first regular diagnosis flag are input to first current limit value calculation unit 13A and also input to first inverter 1A as an ON/OFF command signal for outputs of first inverter 1A.

When the initial diagnosis on the drive control system for first inverter 1A is completed and also first inverter 1A normally operates, first inverter 1A comes into an ON state that enables outputs, that is, electric motor 130 is being driven.

Meanwhile, when the drive control system for first inverter 1A is under the initial diagnosis, first inverter 1A is turned off, that is, electric motor 130 is kept suspended. When any failure occurs in the drive control system for first inverter 1A as well, first inverter 1A is kept OFF.

Likewise, signals indicative of the second initial diagnosis flag and the second regular diagnosis flag are input to second current limit value calculation unit 13B and also input to second inverter 1B as an ON/OFF command signal for outputs of second inverter 1B.

When the initial diagnosis on the drive control system for second inverter 1B is completed and also second inverter 1B normally operates, second inverter 1B comes into an ON state that enables outputs. If the drive control system for second inverter 1B is under the initial diagnosis, second inverter 1B is kept OFF. When any failure occurs in the drive control system for second inverter 1B as well, second inverter 1B is kept OFF.

In addition, provided between first dead time compensation unit 9A and second dead time compensation unit 9B, and first inverter 1A and second inverter 1B is an initial-diagnosis output control unit 17 for controlling whether to enable/disable output of the PWM signal to first inverter 1A and second inverter 1B during the initial diagnosis.

First current limit value calculation unit 13A outputs the first current limit value CUL1 to second current limit value calculation unit 13B, total current limit value calculation unit 14, and voltage distribution constant calculation unit 12. Meanwhile, second current limit value calculation unit 13B outputs the second current limit value CUL2 to first current limit value calculation unit 13A, total current limit value calculation unit 14, and voltage distribution constant calculation unit 12.

Furthermore, total current limit value calculation unit 14 sets the total sum of the first current limit value CUL1 and the second current limit value CUL2 as total current limit value CULS (CULS=CUL1+CUL2) and then outputs the total current limit value CULS (%) to voltage distribution constant calculation unit 12 and target current value calculation unit 3.

Then, target current value calculation unit 3 corrects, with the total current limit value CULS, the target current value that is calculated based on the target assist torque etc. and then outputs the corrected value to output voltage calculation unit 4.

That is, if the total current limit value CULS equals 100%, target current value calculation unit 3 outputs the target current value that is calculated based on the target assist torque etc., to output voltage calculation unit 4 as it is. If the total current limit value CULS falls below 100%, target current value calculation unit 3 corrects to a smaller value, the target current value that is calculated based on the target assist torque etc. and then outputs the corrected value to output voltage calculation unit 4.

In the thus-configured electric motor drive device, first current limit value calculation unit 13A sets the first current limit value CUL1 for first inverter 1A, and second current limit value calculation unit 13B sets the second current limit value CUL2 for second inverter 1B.

Then, first voltage dividing unit 6A outputs the d-axis voltage command value $V_d1$ and the q-axis voltage command value $V_q1$ for first winding set 2A based on the current limit value CUL1. Moreover, second voltage dividing unit 6B outputs the d-axis voltage command value $V_d2$ and the q-axis voltage command value $V_q2$ for second winding set 2B based on the current limit value CUL2. Owing to the above configuration, an output ratio between first inverter 1A and second inverter 1B is changed under a predetermined condition.

To give examples of the predetermined condition for changing the output ratio between first inverter 1A and second inverter 1B, the configuration illustrated in FIG. 2 employs, as the predetermined condition, the timing at which the initial diagnosis ends and the presence of any abnormality in inverters 1A and 1B.

More specifically, in this configuration, first current limit value calculation unit 13A calculates the first current limit value CUL1 according to the first initial diagnosis flag, and second current limit value calculation unit 13B calculates the second current limit value CM according to the second initial diagnosis flag, whereby the output ratio could be changed depending on variations in the timing at which the initial diagnosis on the drive control system for first inverter 1A is completed and the timing at which the initial diagnosis on the drive control system for second inverter 1B is completed.

Furthermore, first current limit value calculation unit 13A calculates the first current limit value CUL1 according to the anti-overheat first current limit value OHUL1, and second current limit value calculation unit 13B calculates the second current limit value CUL2 according to the anti-overheat second current limit value OHUL2, whereby the output ratio could be changed depending on whether inverters 1A and 1B suffer from overheating, that is, suffer from temperature rise beyond a predetermined level.

Note that in this embodiment, a standard output ratio between first inverter 1A and second inverter 1B is set to "50%:50%", which means that the supply power of first inverter 1A equals that of second inverter 1B, by way of example. In the above configuration, this output ratio is changed from "50%:50%" according to the timing at which the initial diagnosis ends or the detection of abnormal overheating.

FIG. 3 is a flowchart illustrating an example of the processing for setting an output ratio between first inverter 1A and second inverter 1B, which is executed by electronic control unit 150.

In other words, the flowchart of FIG. 3 illustrates an example of processing in first current limit value calculation unit 13A, second current limit value calculation unit 13B, total current limit value calculation unit 14, and voltage distribution constant calculation unit 12.

A routine illustrated in the flowchart of FIG. 3 is interruptedly performed by electronic control unit 150 at predetermined time intervals.

In steps S501 to S506, the processing for setting the output ratio is performed by electronic control unit 150 upon the initial diagnosis executed at the startup of electric motor 130.

In step S501, electronic control unit 150 decides whether the first initial diagnosis flag is set ON, which indicates that the initial diagnosis on the drive control system for first inverter 1A is completed and also whether the first current limit value CUL1 does not equal 50%, i.e., the first current limit value CUL1 does not reach 50% under startup state.

The first current limit value CUL1 is initially set to 0%, which means that power supply should be interrupted. At the startup of electric motor 130, the first current limit value CUL1 is increased from the initial value, 0% up to 50%.

Provided that "first initial diagnosis flag=ON" and "first current limit value CUL1≠50%", electronic control unit 150 proceeds to step S502. If "first initial diagnosis flag=OFF", electronic control unit 150 skips steps S502 and S503 and advances to step S504. Also when "first current limit value CUL1=50%", electronic control unit 150 skips steps S502 and S503 and advances to step S504.

As described later, at the completion of the initial diagnosis on the drive control system for first inverter 1A, the first current limit value CUL1 is gradually increased from the initial value, 0%. After that, when reaching 50%, the first current limit value CUL1 is not increased any more and kept at 50%.

Thus, if "first initial diagnosis flag=ON" and "first current limit value CUL1≠50%", the first current limit value CUL1 is being increased up to 50%.

After deciding that "first initial diagnosis flag=ON" and "first current limit value CUL1≠50%", electronic control unit 150 proceeds step S502 to decide whether or not the second current limit value CUL2 is either 0% or 50%.

If the second current limit value CUL2 is neither 0% nor 50%, i.e., the second current limit value CUL2 is being gradually increased from the initial value, 0% up to 50%, electronic control unit 150 skips the processing for increasing the first current limit value CUL1 in step S503 and advances to step S504. In other words, in this configuration, the processing for increasing the first current limit value CUL1 and the processing for increasing the second current limit value CUL2 are not performed concurrently.

On the other hand, if the second current limit value CUL2 is either 0% or 50%, i.e., the processing for increasing the second current limit value CUL2 at the startup of electric motor 130 does not start or the processing for increasing the second current limit value CUL2 is completed, electronic control unit 150 proceeds to step S503 to execute the processing for increasing the first current limit value CUL1 from the latest value by a predetermined value (for example, 0.05%).

In step S504, electronic control unit 150 decides whether the initial diagnosis on the drive control system for second inverter 1B is completed and the second initial diagnosis flag is set ON and also, the second current limit value CUL2 does not equal 50%, i.e., the second current limit value CUL2 does not reach 50%.

Then, if "second initial diagnosis flag=ON" and "second current limit value CUL2≠50%", electronic control unit 150 proceeds to step S505 to decide whether or not the first current limit value CUL1 is either 0% or 50%.

If the first current limit value CUL1 is either 0% or 50%, electronic control unit 150 proceeds to step S506 to execute the processing for increasing the second current limit value CUL2 from the latest value by a predetermined value for example, 0.05%).

In other words, provided that "second initial diagnosis flag=ON" and "second current limit value CUL2≠50%" and also, the first current limit value CUL1 is either 0% or 50%, electronic control unit 150 executes the processing for increasing the second current limit value CUL2 from the latest value.

The initial diagnosis on the drive control system for first inverter 1A and the initial diagnosis on the drive control system for second inverter 1B are started at the same time and executed concurrently. At this time, however, the diagnosis might be performed again or the result thereof is examined, for example, in case of a possible risk of failures. As a result, the initial diagnosis for one inverter might end earlier than the initial diagnosis for the other.

For example, considering that the initial diagnosis on the drive control system for first inverter 1A ends earlier than that on the drive control system for second inverter 1B, the first initial diagnosis flag is switched from OFF to ON, whereas the second initial diagnosis flag is kept OFF. Moreover, since the initial values of the first current limit value CUL1 and the second current limit value CUL2 are both 0%, electronic control unit 150 proceeds from step S501 to step S502.

Then, if deciding that the second current limit value CUL2 is 0% in step S502, electronic control unit 150 proceeds to step S503 to increase the first current limit value CUL1.

Electronic control unit 150 further proceeds to step S504. Since the initial diagnosis on the drive control system for second inverter 1B is not completed and the second initial diagnosis flag is set to OFF, however, electronic control unit 150 skips steps S505 and S506 and advances to step S507. As a result, the processing for increasing the second current limit value CUL2 does not start and the second current limit value CUL2 is kept at the initial value, 0%.

If the second current limit value CUL2 is kept at the initial value, 0%, it is decided in step S502 that "second current limit value CUL2=0%", the processing for increasing the first current limit value CUL1 is continued.

During this processing for increasing the first current limit value CUL1, if the initial diagnosis on the drive control system for second inverter 1B is completed and the second initial diagnosis flag is switched from OFF to ON, the second current limit value CUL2 is 0% and thus, electronic control unit 150 proceeds to step S505.

However, during the processing for increasing the first current limit value CUL1, if the first current limit value CUL1 does not reach 50%, electronic control unit 150 skips step S506 and thus, the processing for increasing the second current limit value CUL2 does not start.

Then, if the initial diagnosis on the drive control system for second inverter 1B is completed, after which the first current limit value CUL1 reaches 50%, electronic control unit 150 proceeds to step S506 to start the processing for increasing the second current limit value CUL2.

Likewise, if the initial diagnosis on the drive control system for second inverter 1B ends earlier than the initial diagnosis on the drive control system for first inverter 1A, electronic control unit 150 starts the processing for increasing the second current limit value CUL2 ahead. Electronic control unit 150 starts the processing for increasing the first current limit value CUL1 only after the initial diagnosis on the drive control system for first inverter 1A is completed and also the second current limit value CUL2 reaches 50%.

If the output ratio between first inverter 1A and second inverter 1B is fixed at "50%:50%", electric motor 130 cannot start up until the initial diagnosis on the drive control system for first inverter 1A and the initial diagnosis on the drive control system for second inverter 1B are both completed.

In contrast, according to the configuration of the electric motor drive device of this embodiment in which the output ratio between first inverter 1A and second inverter 1B can be changed, while the output rate is kept at 0% for the inverter being under the initial diagnosis, the output rate can be independently increased ahead for the inverter that has first completed its initial diagnosis.

Accordingly, electronic control unit 150 enables output of the inverter having first completed its initial diagnosis ahead of the other to thereby start up electric motor 130. Compared to the inverters having the fixed output ratio, it is possible to more quickly start up electric motor 130.

Owing to the early startup of electric motor 130, electric power steering device 100 can immediately generate the steering assist force.

In addition, electronic control unit 150 waits until the output rate of the inverter that has first completed its initial diagnosis reaches the highest of its share, 50% and then starts increasing the output of the inverter that has next completed its initial diagnosis. Electronic control unit 150 increases the total sum of outputs from both the inverters up to 100% at the end. Therefore, an output torque of electric motor 130 can be smoothly increased to a target torque.

Accordingly, electric power steering device 100 can smoothly increase the steering assist force, whereby a driver is less likely to feel discomfort in steering at the start of applying the steering assist force.

If the processing for increasing the first current limit value CUL1 and the processing for increasing the second current limit value CUL2 are both completed under the startup state, and the first current limit value CUL1 and the second current limit value CUL2 both reach 50%, electronic control unit 150 skips steps S503 and S506 and advances to step S507.

Note that in the configuration of the above embodiment, after the output rate of the inverter that has first completed its initial diagnosis reaches the highest of its share, 50%, the output of the inverter that has next completed its initial diagnosis is increased. It is, however, possible to start increasing the output of the inverter that has next completed its initial diagnosis at any timing within a period from the completion of the initial diagnosis until the output rate of the inverter having the output increased ahead reaches a target value of the share (for example, 50%).

Here, at the time of concurrently increasing the output rate of first inverter 1A and the output rate of second inverter 1B, electronic control unit 150 can set the rates at which the output rates of the respective inverters are increased, for example, so that the rate of increasing the total of these output rates can equal that for the case where the output rate of one inverter is kept at 50% while the output rate of the other inverter is increased.

Thus, the output torque of electric motor 130 can be smoothly increased to a target torque at a constant rate. This processing for setting the rate is described in detail below.

After setting the first current limit value CUL1 and the second current limit value CUL2 according to the timing of completing the initial diagnosis as described above, electronic control unit 150 proceeds to steps S507 and S508 to correct the current limit values CUL1 and CUL2 for first inverter 1A and second inverter 1B so as to suppress the risk of overheating.

In step S507, electronic control unit 150 compares the anti-overheat current limit value that is set according to the measured temperature of first inverter 1A, i.e., the current upper value OHUL1 for suppressing the risk of overheating, with the first current limit value CUL1 that is set in steps S501 to S506, and then defines a lower limit value as the final first current limit value CUL1.

In other words, if the anti-overheat current limit value OHUL1 is lower than the first current limit value CUL1, the output of first inverter 1A should be reduced to suppress the risk of overheating. Thus, electronic control unit 150 corrects the first current limit value CUL1 to a lower value.

Likewise, in step S508, electronic control unit 150 compares the anti-overheat current limit value OHUL2 that is set according to the measured temperature of second inverter 1B, i.e., the current upper value OHUL2 for suppressing the risk of overheating in second inverter 1B, with the second current limit value CUL2 that is set in steps S501 to S506, and then defines a lower limit value as the final second current limit value CUL2.

In other words, if the anti-overheat current limit value OHUL2 is lower than the second current limit value CUL2, the output of second inverter 1B should be reduced to suppress the risk of overheating in second inverter 1B, the second current limit value CUL2 is corrected to a lower value.

Note that if inverters 1A and 1B have the temperature within a normal range and thus do not suffer from overheating, the anti-overheat current limit values OHUL1 and OHUL2 are set to 50% or higher. Then, in steps S507 and S508, neither the first current limit value CUL1 nor the second current limit value CUL2 are corrected to a lower value.

Accordingly, if first inverter 1A shows temperature rise beyond a preset range while the temperature of second inverter 1B is kept within the preset range, for example, the first current limit value CUL1 is corrected to a lower value, whereas the second current limit value CUL2 is not corrected.

After correcting the first current limit value CUL1 and the second current limit value CUL2 according to the anti-overheat current limit values OHUL1 and OHUL2 in steps S507 and S508, electronic control unit 150 proceeds to step S509 to execute the processing for setting the total sum of the first current limit value CUL1 and the second current limit value CUL2 as the final total current limit value CULS.

In subsequent steps S510 and S511, electronic control unit 150 sets a first voltage distribution constant VDC1 that defines an output voltage for first inverter 1A, and a second voltage distribution constant VDC2 that defines an output voltage for second inverter 1B.

In step S510, electronic control unit 150 executes processing for setting a ratio of the first current limit value CUL1 to the total current limit value CULS as the first voltage distribution constant VDC1 (VDC1=CUL1/CULS).

Furthermore, in step S511, electronic control unit 150 executes processing for setting a ratio of the second current limit value CUL2 to the total current limit value CULS as the second voltage distribution constant VDC2 (VDC2=CUL2/CULS).

Here, if the total current limit value CULS is 100% and the first current limit value CUL1 and the second current limit value CUL2 are both 50%, the first voltage distribution constant VDC1 and the second voltage distribution constant VDC2 are both set to 50%.

In addition, if the first current limit value CUL1 is set to less than 50% because of overheating in first inverter 1A and the second current limit value CUL2 is set to 50% because of the normal range of temperature of second inverter 1B, for example, the first voltage distribution constant VDC1 is set to less than 50%, whereas the second voltage distribution constant VDC2 is set to more than 50%.

Accordingly, the temperature of the inverter that is about to overheat is reduced, making it possible to suppress the risk of overheating in the inverter and thus to diminish the adverse effect of overheating on a circuit board or electronic components on the board. Furthermore, the voltage distribution constant VDC is corrected to a higher value for the inverter of the normal temperature so as to compensate for the output drop in the inverter that is about to overheat, making it possible to suppress reduction in output torque of electric motor 130.

If the output ratio between first inverter 1A and second inverter 1B is fixed, when one inverter involves abnormal temperature rise, the output of the inverter involving the abnormal temperature rise should be decreased to suppress the risk of overheating, while the output of the other inverter not involving such abnormal temperature rise should be concurrently decreased as well. In this case, even though the risk of overheating can be suppressed, the output torque of electric motor 130 considerably decreases.

In contrast, according to the electric motor drive device illustrated in FIG. 2, the output ratio between first inverter 1A and second inverter 1B is variable, whereby the output of the inverter involving the abnormal temperature rise can be decreased while the output of the inverter not involving such abnormal temperature rise can be increased. This makes it possible to suppress reduction in output torque of electric motor 130 as well as the risk of overheating.

Note that if first inverter 1A and second inverter 1B both involve the temperature rise and moreover, the degree of temperature rise (temperature level and/or rate of temperature rise) differs between first inverter 1A and second inverter 1B, electronic control unit 150 can reduce both the anti-overheat current limit values OHUL1 and OHUL2 at different rates.

In other words, if first inverter 1A and second inverter 1B both involve any abnormality, electronic control unit 150 can correct the current limit value CUL of the inverter suffering from more serious abnormality to a lower value than that of the other inverter suffering from less serious abnormality.

For example, if both of first inverter 1A and second inverter 1B are about to overheat and moreover, first inverter 1A is more likely to overheat than second inverter 1B, it is possible to set the anti-overheat current limit value OHUL1 of first inverter 1A to A % (0%<A<50%) and set the anti-overheat current limit value OHUL2 of second inverter 1B to B % (A<B<50%).

In addition, conceivable conditions for changing the output ratio between first inverter 1A and second inverter 1B include the timing of completing the initial diagnosis and the temperature level and also, the presence of any failure in current sensors incorporated in inverters 1A and 1B, for example.

In such a configuration that the inverter keeps operating based on an estimated current value, when any abnormality occurs in the current sensor, an accuracy of torque control reduces depending on an error in current estimation.

To overcome this problem, electronic control unit 150 decreases the output rate of the inverter that is controlled based on a current value estimated by the failed current sensor, while keeping or increasing the output rate of the inverter to be controlled based on a current value measured by the normally operating current sensor. Hence, the torque control accuracy is hardly impaired.

Through the above processing, the first voltage distribution constant VDC1 and the second voltage distribution constant VDC2 are defined. In step S512 and subsequent steps, electronic control unit 150 executes processing for correcting the first voltage distribution constant VDC1 and the second voltage distribution constant VDC2, i.e., the output ratio between first inverter 1A and second inverter 2B.

In step S512, electronic control unit 150 decides whether an absolute value of a q-axis current value for first inverter 1A is a predetermined value or more and also, an absolute value of an actual q-axis current value for second inverter 1B is a predetermined value or more.

Note that the actual q-axis current value for first inverter 1A refers to a q-axis current value output from first threeto-two phase converting unit 10A. The actual q-axis current value for second inverter 1B refers to a q-axis current value output from second three-to-two phase converting unit 10B. The predetermined value for the absolute value of the q-axis current value can be set to, for example, 20 A.

In other words, in step S512, electronic control unit 150 decides whether the actual q-axis current value for first inverter 1A is not close to zero and also, the actual q-axis current value for second inverter 1B is not close to zero.

If the q-axis current value is close to zero, there is a large error in current measurement. If a current rate of first inverter 1A does not balance that of second inverter 2B, the influence thereof increases as the current value increases. Thus, electronic control unit 150 decides whether an absolute value of the q-axis current value exceeds a predetermined value. Accordingly, the predetermined value used for comparison with the absolute value of q-axis current value is set in consideration of the error in current measurement and the influence of the unbalanced current rates.

Then, if "|q-axis current value of first inverter 1A|≥predetermined value" and "|q-axis current value of second inverter 1B|≥predetermined value", and also neither q-axis current value of first inverter 1A nor the q-axis current value of second inverter 1B is close to zero, electronic control unit 150 proceeds to step S513.

On the other hand, if at least one of the absolute value of the q-axis current value for first inverter 1A and the absolute value of the q-axis current value for second inverter 1B is less than the predetermined value, in other words, at least one of the q-axis current value for first inverter 1A and the q-axis current value for second inverter 1B is close to zero, electronic control unit 150 skips steps S513 to S515 and advances to step S516.

In step S513, electronic control unit 150 adds the absolute value of the q-axis current value for first inverter 1A to the latest first current integrated value CIN1, and then sets the added value as a present first current integrated value CIN1.

Likewise, in step S514, electronic control unit 150 adds the absolute value of the q-axis current value for second inverter 1B to the latest second current integrated value CIN2 and then, sets the added value as a present second current integrated value CIN2.

In other words, electronic control unit 150 integrates, in step S513, the absolute values of the q-axis current value for first inverter 1A each time this routine is executed and integrates, in step S514, the absolute values of the q-axis current value for second inverter 1B each time this routine is executed.

Note that electronic control unit 150 can integrate d-axis current values in place of the q-axis current values. In addition, electronic control unit 150 can calculate "current value=$\sqrt{(I_q^2+I_d^2)}$" for each inverter and then integrate the current values derived from "current value=$\sqrt{(I_q^2+I_d^2)}$".

Then, in step S515, electronic control unit 150 executes processing for incrementing the latest cumulative count of current value integral calculations performed in steps S513 and S514.

Subsequently, in step S516, electronic control unit 150 decides whether the cumulative count reaches the predetermined number of times.

Note that the predetermined number of times is set to such a value as realizes accurate decision as to whether the current rates are balanced even if the current measurement involves an influence of noise etc. For example, the predetermined number of times can be set to about 100.

Then, if the cumulative count of current value integral calculations reaches the predetermined number of times, electronic control unit 150 proceeds to step S517. If the cumulative count of current value integral calculations is less than the predetermined number of times, electronic control unit 150 skips steps S517 and S518 and advances to step S519.

If the cumulative count of current value integral calculations reaches the predetermined number of times and hence, the processing advances to step S517, electronic control unit 150 calculates a balance command value that indicates the balance between an actual output current of first inverter 1A and an actual output current of second inverter 1B based on the first current integrated value CIN1, the second current integrated value CIN2, the first current limit value CUL1, and the second current limit value CUL2, following the equation of "balance command value=[CIN1/CIN2]/[CUL1/CUL2]".

In subsequent step S518, electronic control unit 150 resets all of the first current integrated value CIN1, the second current integrated value CIN2, and the cumulative count of current value integral calculations to zero so as to restart the processing for integrating the actual current values.

Note that the initial value of the balance command value is 100%.

The above balance command value indicates whether the ratio between the actual output current of first inverter 1A and the actual output current of second inverter 1B balances the ratio between the first current limit value CIN1 and the second current integrated value CIN2. The more the balance command value approaches 100%, the more the output current ratio balances the ratio between the first current limit value CUL1 and the second current limit value CUL2 under the control.

On the other hand, for example, if a power supply voltage for first inverter 1A differs from that for second inverter 1B, or the wiring impedance in the drive control system for first inverter 1A differs from that in the drive control system for second inverter 1B, the ratio between the actual output current of first inverter 1A and the actual output current of second inverter 1B does not match a value that balances the ratio between the first current limit value CUL1 and the second current limit value CUL2. That is, the actual output current of first inverter 1A and/or the actual output current of second inverter 1B do not match a target value and thus, the balance command value does not equal 100%.

More specifically, the balance command value of more than 100% means that the actual output of first inverter 1A is higher than the command value or the actual output of second inverter 1B is lower than the command value.

In contrast, the balance command value of less than 100% means that the actual output of first inverter 1A is lower than the command value or the actual output of second inverter 1B is higher than the command value.

In step S519, electronic control unit 150 corrects the first output voltage distribution constant VDC1 based on the balance command value. More specifically, electronic control unit 150 executes the processing for setting the calculation result of "VDC1×[150%-balance command value/2]" as a corrected first voltage distribution constant VDC1.

Moreover, in step S520, electronic control unit 150 corrects the second voltage distribution constant VDC2 based on the balance command value. More specifically, electronic control unit 150 executes the processing for setting the calculation result of "VDC2×[50%+balance command value/2]" as a corrected second voltage distribution constant VDC2.

For example, if the ratio between the actual output current of first inverter 1A and the actual output current of second inverter 1B balances the ratio between the first current limit value CUL1 and the second current limit value CUL2, "balance command value=100%".

At this time, "VDC1×[150%-balance command value/2]=VDC1×[150%−100%/2]=VDC1×100%" and also, "VDC2×[50%+balance command value/2]=VDC2×[50%+100%/2]=VDC2×100%".

Accordingly, the first voltage distribution constant VDC1 and the second voltage distribution constant VDC1 are not corrected but kept at the calculation result obtained in steps S510 and S511.

On the other hand, if the actual output current of first inverter 1A is higher than the value that balances the ratio between the first current limit value CUL1 and the second current limit value CUL2 and/or the actual output current of second inverter 1B is lower than the same and hence, the balance command value is larger than 100%, "150%-balance command value/2" is less than 100% and "50%+balance command value/2" is more than 100%.

As a result, the first voltage distribution constant VDC1 is corrected to a lower value, while the second voltage distribution constant VDC2 is corrected to a higher value, whereby the balance command value approximates 100% and the ratio between the actual output current of first inverter 1A and the actual output current of second inverter 1B is corrected so as to approximate the ratio between the first current limit value CUL1 and the second current limit value CUL2.

On the other hand, if the actual output current of first inverter 1A is lower than the value that balances the ratio between the first current limit value CUL1 and the second current limit value CUL2 and/or the actual output current of second inverter 1B is higher than the same and hence, the balance command value is less than 100%, "150%−balance command value/2" is more than 100% and "50%+balance command value/2" is less than 100%.

As a result, the first voltage distribution constant VDC1 is corrected to a higher value, while the second voltage distribution constant VDC2 is corrected to a lower value, whereby the balance command value approximates 100%, and the ratio between the actual output current of first inverter 1A and the actual output current of second inverter 1B is corrected so as to approximate the ratio between the first current limit value CUL1 and the second current limit value CUL2.

Through the above processing in steps S512 to S520, the first voltage distribution constant VDC1 and the second voltage distribution constant VDC2 are corrected, whereby even if the power supply voltage or impedance differs, the ratio between the actual output current for inverter 1A and that for inverter 1B can be set so as to approximate the ratio between the first current limit value CUL1 and the second current limit value CUL2. Hence, the actual current ratio can be controlled with high accuracy.

The thus-defined first voltage distribution constant VDC1 is output to first voltage dividing unit 6A illustrated in FIG. 2. First voltage dividing unit 6A multiplies the first voltage distribution constant VDC1 by the d-axis voltage command value $V_d$ and the q-axis voltage command value $V_q$, which are output from output voltage calculation unit 4 to thereby convert these to a d-axis voltage command value $V_d1$ and a q-axis voltage command value $V_q1$ for first inverter 1A.

Likewise, the second voltage distribution constant VDC2 is output to second voltage dividing unit 6B illustrated in FIG. 2. Second voltage dividing unit 6B multiplies the second voltage distribution constant VDC2 by the d-axis voltage command value $V_d$ and the q-axis voltage command value $V_q$, which are output from output voltage calculation unit 4 to thereby convert these to a d-axis voltage command value $V_d2$ and a q-axis voltage command value $V_q2$ for second inverter 1B.

FIG. 4 is a timing chart illustrating an example of how the current limit values CUL1 and CUL2 and the voltage distribution constants VDC1 and VDC2 change at the startup of electric motor 130.

Note that in the illustrated example in the timing chart of FIG. 4, the first voltage distribution constant VDC1 and the second voltage distribution constant VDC2 are not corrected in steps S519 and S520 in the flowchart of FIG. 3.

When the initial diagnosis on first inverter 1A is completed at time t1, the processing for increasing the first current limit value CUL1 from 0% is started. On the other hand, at time t1, the initial diagnosis on second inverter 1B is not completed, the second current limit value CUL2 is kept at 0%.

Here, the first voltage distribution constant VDC1 is calculated based on the following equation of "VDC1=CUL1/CULS". Meanwhile, since the second current limit value CUL2 is 0%, "CULS=CUL1". Hence, during the processing for increasing the first current limit value CUL1, which is executed since the second current limit value CUL2 is 0%, the first voltage distribution constant VDC1 is kept at 100%.

Here, in the equations of "VDC1=CUL1/CULS" and "VDC2=CUL2/CULS" "CULS=0%", that is, the first current limit value CUL1 and the second current limit value CUL2 are both 0%, the first voltage distribution constant VDC1 and the second voltage distribution constant VDC2 are set to 0%.

At time t2, the initial diagnosis on second inverter 1B is completed. However, at time t2, the first current limit value CUL1 does not reach up to 50% and hence, the processing for increasing the second current limit value CUL2 does not start.

Then, if the first current limit value CUL1 reaches 50% at time t3, the processing for gradually increasing the second current limit value CUL2 kept at 0% starts.

When the processing for increasing the second current limit value CUL2 starts, "CULS=CUL1" changes to "CULS=CUL1+CUL2" in the equation of "VDC1=CUL1/CULS". Thus, the first voltage distribution constant VDC1 begins to decrease from 100% and then, the second voltage distribution constant VDC2 is relatively increasing from 0%.

When the second current limit value CUL2 reaches 50% at time t4, the first voltage distribution constant VDC1 and the second voltage distribution constant VDC2 are both 50% and thereafter kept at 50% ("VDC1=50%" and "VDC2=50%").

Note that if the power supply voltage differs between first inverter 1A and second inverter 1B or the wiring impedance in the drive control system of first inverter 1A differs from that in the drive control system of second inverter 1B, the first voltage distribution constant VDC1 and the second voltage distribution constant VDC2 are corrected from 50% so that the actual current ratio can be kept at "50:50".

Time t5 refers to a timing at which it is decided that the temperature of first inverter 1A exceeds the preset temperature, i.e., the abnormal temperature rise is detected. In this case, it is required to decrease the output of first inverter 1A to reduce the temperature of first inverter 1A.

If first inverter 1A suffers from abnormal temperature rise, in the electric motor drive device as illustrated in FIG. 2, the anti-overheat current limit value OHUL1 is set to suppress the temperature rise. If the first current limit value CUL1 exceeds the current limit value OHUL1, the current limit value OHUL1 is set as the final first current limit value CUL1, whereby the first current limit value CUL1 is corrected to less than 50%.

On the other hand, since the temperature of second inverter 1B falls within the normal range, the second current limit value CUL2 is kept at 50%.

If the first current limit value CUL1 is corrected to less than 50% to thereby decrease the total current limit value VDCS used for calculating the first voltage distribution constant VDC1 and the second voltage distribution constant VDC2, the first voltage distribution constant VDC1 is corrected to a lower value while the second voltage distribution constant VDC2 is corrected to a higher value.

Note that in the processing illustrated in the flowchart of FIG. 3, which is executed by electronic control unit 150, for example, if first inverter 1A suffers from the abnormal temperature rise, the first current limit value CUL1 is corrected to less than 50%. Meanwhile, since the temperature of second inverter 1B falls within the normal range, the second current limit value CUL2 thereof is kept at 50%. In contrast, in the processing illustrated in the timing chart of FIG. 5, the second current limit value CUL2 is increased as much as the first current limit value CUL1 is corrected to less than 50%, so that the total current limit value CULS can be kept at 100%.

In the timing chart of FIG. 5, at time t1, it is decided that the abnormal temperature rise occurs in first inverter 1A to thereby correct the first current limit value CUL1 to less than 50%. Meanwhile, since such abnormal temperature rise is not detected in second inverter 1B, the second current limit value CUL2 is corrected to more than 50% so as to keep the total current limit value CULS at 100%.

Also in this case, although the total current limit value CULS is not changed, the first voltage distribution constant VDC1 is corrected to a lower value along with the decrease in first current limit value CUL1, while the second voltage distribution constant VDC2 is corrected to a higher value along with the increase in second current limit value CUL2.

Here, in the illustrated example in the timing chart of FIG. 4, it is decided that the abnormal temperature rise occurs in first inverter 1A, whereby the total current limit value CULS falls below 100%. In the illustrated example in the timing chart of FIG. 5, however, even if it is decided that the abnormal temperature rise occurs in first inverter 1A, the total current limit value CULS is kept at 100% as described above.

Then, the first voltage distribution constant VDC1 is calculated based on the equation of "VDC1=CUL1/CULS", and the second voltage distribution constant VDC2 is calculated based on the equation of "VDC2=CUL2/CULS". Thus, in the illustrated example in the timing chart of FIG. 5, along with the abnormal temperature rise in first inverter 1A, the first voltage distribution constant VDC1 decreases and the second voltage distribution constant VDC2 increases more than in the illustrated example in the timing chart of FIG. 5.

Figure 6:
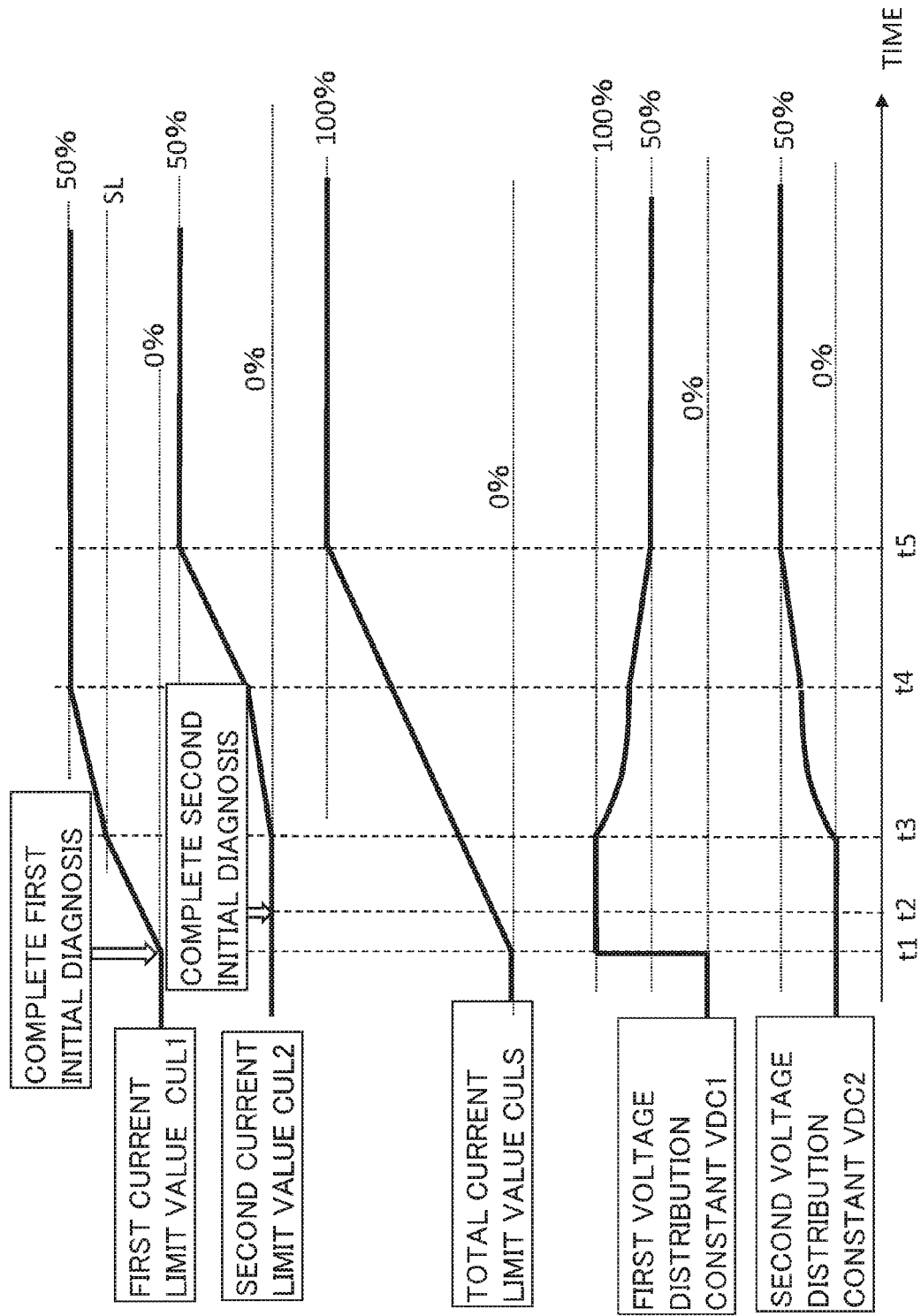
FIG. 6 is a timing chart illustrating an example of how to change the output ratio between the first inverter and the second inverter according to the embodiment of the present invention.

FIG. 6 is a timing chart illustrating another example of the processing for setting the current limit values CUL1 and CUL2 at the startup of electric motor 130.

When the initial diagnosis on first inverter 1A is completed at time t1, the processing for increasing the first current limit value CUL1 from 0% starts. On the other hand, at time t1, the initial diagnosis on second inverter 1B is not completed and thus the second current limit value CUL2 is kept at 0%.

The initial diagnosis on second inverter 1B is completed at time t2, but the first current limit value CUL1 does not increase up to a set value SL (0%<set value SL<50%) at time t2. Hence, the processing for increasing the second current limit value CUL2 does not start.

Note that since "CUL2=0%" and "CUL1=CULS" during a period from time t1 to time t3, the inverters are kept under such conditions that "VDC1=100%" and "VDC2=0%".

Then, if the first current limit value CUL1 reaches the set value SL at time t3, the processing for gradually increasing the second current limit value CUL2 kept at 0% starts, and thus the processing for increasing the first current limit value CUL1 and the processing for increasing the second current limit value CUL2 are concurrently performed.

Here, in order that the rate of increasing the total current limit value CULS at time t3 and thereafter equals the one during the period from time t1 to time t3, the rate of increasing the first current limit value CUL1 is set lower than the rate before time t3 and then the second current limit value CUL2 is increased, during a period from time t3 until the first current limit value CUL1 reaches 50%.

During the period from time t3 to time t4, the first current limit value CUL1 and the second current limit value CUL2 are both corrected to a higher value, whereby the total current limit value CULS increases. As a result, while the first voltage distribution constant VDC1 is decreased from 100%, the second voltage distribution constant VDC2 is increased from 0%.

If the first current limit value CUL1 reaches 50% at time t4, the first current limit value CUL1 is kept at 50% at time t4 and thereafter. If the second current limit value CUL2 is increased at the same rate as before time t4, the rate of increasing the total current limit value CULS reduces.

At time t4 and thereafter, the second current limit value CUL2 is increased at the rate of increasing the first current limit value CUL1 during a period from time t1 to time t3. Then, if the second current limit value CUL2 reaches 50% at time t5, the processing for increasing the first current limit value CUL1 and the second current limit value CUL2 is completed.

During the period from time t4 to time t5, the first current limit value CUL1 is kept at 50%, and the second current limit value CUL2 is increased toward 50%. Hence, if the second current limit value CUL2 is increased at a constant rate, the first voltage distribution constant VDC1 is decreased down to 50% at the constant rate. The second voltage distribution constant VDC2 is increased up to 50% at the constant rate.

Note that the present invention is not limited to the configuration that the total current limit value CULS is increased at a constant rate from 0% to 100%. For example, the rates of increasing the first current limit value CUL1 and the second current limit value CUL2 can be set such that the total current limit value CULS is increased at a gradually decreasing rate.

Furthermore, it is possible to execute the processing for setting the current limit value at the startup of the electric motor as illustrated in the timing chart of FIG. 6 in combination with either the processing for setting the current limit value upon the temperature rise as illustrated in the timing chart of FIG. 4 or the processing for setting the current limit value upon the temperature rise as illustrated in the timing chart of FIG. 5.

The foregoing description of the embodiments according to the present invention is provided for illustrative purposes only, and it is not for the purpose of limiting the invention, the invention as claimed in the appended claims and their equivalents.

In the above embodiments, the basic output ratio between first inverter 1A and second inverter 1B at the startup of electric motor 130 is set to "50:50", but the present invention is not limited to the above output ratio. The output rate of first inverter 1A may be higher than second inverter 1B or the output rate of second inverter 1B may be higher than first inverter 1A.

Moreover, the present invent on is not limited to the configuration of electric motor 130 provided with first winding set 2A and second winding set 2B. The electric motor can be configured such that a pair of winding sets are disposed and plural inverters supply power to the same winding.

The electric motor drive device is applicable to not only an electric motor that generates a steering assist force in the electric power steering device but also, for example, an electric motor for an electric brake constituting a braking system that automates pressing-down on a brake pad in a vehicle or an electric motor for driving an in-vehicle oil pump or water pump.

In addition, the first voltage distribution constant VDC1 and the second voltage distribution constant VDC2 can be corrected based on moving average deviations or instantaneous value of an actual current measured value in each inverter.

Moreover, it is possible to omit the processing for correcting the first voltage distribution constant VDC1 and the second voltage distribution constant VDC2 in steps S512 to S520 in the flowchart of FIG. 3

Furthermore, the output ratio between first inverter 1A and second inverter 1B can be changed according to either the detection of the temperature rise in the inverter or abnormality in the current sensor, or the timing of completing the initial diagnosis.

In addition, the present invention is not limited to the configuration of the electric motor drive device provided with the two inverters but is applicable to the configuration in which the device has three or more inverters that supply power to the same electric motor, and the output ratio between at least two of the inverters is variable.

In addition, the temperature of the inverter can be estimated based on the measured value of the temperature, which varies in Correlation with the temperature of the other inverters or estimated based on the output current of the inverter as well as directly measured with the temperature sensor.

REFERENCE SYMBOL LIST

1A First inverter
1B Second inverter
2A First winding set
2B Second winding set
3 Target current value calculation unit
4 Output voltage calculation unit
5 Electric motor rotational speed calculation unit
6A First voltage dividing unit
6B Second voltage dividing unit
7A First output duty calculation unit
7B Second output duty calculation unit
8A First two-to-three phase converting unit
8B Second two-to-three phase converting unit
9A First dead time compensation unit
9B Second dead time compensation unit
10A First three-to-two phase converting unit
10B Second three-to-two phase converting unit
11A First adder
11B Second adder
12 Voltage distribution constant calculation unit
13A First current limit value calculation unit
13B Second current limit value calculation unit
14 Total current limit value calculation unit
15A First anti-overheat logic unit
15B Second anti-overheat logic unit
16A First temperature sensor
16B Second temperature sensor
130 Electric motor

The invention claimed is:

1. An electric motor drive device comprising:
a control unit;
a first drive system including a first inventor; and
a second drive system including a second inverter, wherein
the first and second inverters supply power to one electric motor, and
the control unit is configured to:
initiate diagnoses on the first drive system and the second drive system, respectively under such conditions that outputs from the first and second inverters are shut down, before startup of the electric motor,
if the first drive system has completed its first diagnosis ahead of the second drive system and found said first diagnosis to be normal, increase the output of the first inverter ahead of the second inverter, and then, if the second drive system has completed its second diagnosis and found said second diagnosis to be normal, increase the output of the second inverter after the output of the first inverter is increased up to a set value, and
if the second drive system has completed its first diagnosis ahead of the first drive system and found said first diagnosis to be normal, increase the output of the second inverter ahead of the first inverter, and then, if the first drive system has completed its second diagnosis and found said second diagnosis to be normal, increase the output of the first inverter after the output of the second inverter is increased up to a set value.

2. The electric motor drive device according to claim 1, wherein
the first drive system includes a first control unit configured to control the first inverter and the output of the first inverter,
the second drive system includes a second control unit configured to control the second inverter and an output of the second inverter, and
the control unit executes a diagnosis on at least one of the first inverter and the first control unit as the diagnosis on the first drive system and executes a diagnosis on at least one of the second inverter and the second control unit as the diagnosis on the second drive system.

3. An electric motor drive device comprising:
an electric motor;
a control unit; and
a first drive system including a first inverter, and a second drive system including a second inverter, wherein
the electric motor comprises a three-phase synchronous electric motor including a first winding set composed of three-phase windings supplied with power from the first inverter, and a second winding set composed of three-phase windings supplied with power from the second inverter, the control unit is configured to change a ratio between the output of the first inverter and the output of the second inverter according to a predetermined condition, the control unit includes a first control unit configured to control the output of the first inverter and a second control unit configured to control the output of the second inverter, the first and second control units each comprise:
- a three-to-two phase converting unit configured to convert a phase current of the inverter to a d-axis current and a q-axis current,
- an indicative signal generating unit configured to generate a d-axis indicative signal and a q-axis indicative signal based on the d-axis current and the q-axis current, which are converted by the three-to-two phase converting unit, and a target current;
- a two-to-three phase converting unit configured to convert the d-axis indicative signal and the q-axis indicative signal to three-phase command values; and
- an output ratio correcting unit configured to correct the d-axis indicative signal and the q-axis indicative signal, which are input to the two-to-three phase converting unit to thereby change the ratio between the output of the first inverter and the output of the second inverter, and the output ratio correcting unit includes a current upper limit value calculation unit that calculates a first upper limit value as an upper limit value of output current of the first inverter and a second upper limit value as an upper limit value of output current of the second inverter according to a predetermined condition, and a ratio of the first upper limit value to a total upper limit value corresponding to the total sum of the first upper limit value and the second upper limit value is set as an output voltage ratio of the first inverter, while a ratio of the second upper limit value to the total upper limit value is set as an output voltage ratio of the second inverter to thereby correct the d-axis indicative signal and the q-axis indicative signal according to the output voltage ratio.

4. The electric motor drive device according to claim 3, wherein the control unit decreases the output of one of the first inverter and the second inverter under the predetermined condition, and keeps or increases the output of the other inverter.

5. The electric motor drive device according to claim 3, wherein the control unit decreases the output of the first inverter and the output of the second inverter at different rates, under the predetermined condition.

6. The electric motor drive device according to claim 3, wherein the predetermined condition includes temperature rise in at least one of the first inverter and the second inverter.

7. The electric motor drive device according to claim 3, further comprising:
- a first current sensor configured to measure an output current of the first inverter; and
- a second current sensor configured to measure an output current of the second inverter,
- wherein the predetermined condition includes an abnormality in at least one of the first current sensor and the second current sensor.

8. The electric motor drive device according to claim 3, wherein the output ratio correcting unit changes the output voltage ratio according to at least one of the d-axis current and the q-axis current, which are converted by the three-to-two phase converting unit.

9. The electric motor drive device according to claim 3, wherein if an abnormality occurs in one of the first drive system and the second drive system, the control unit decreases an output of the inverter the drive control system of which suffers from the abnormality while keeping or increasing an output of the other inverter the drive control system of which normally operates.

10. The electric motor drive device according to claim 3, wherein if abnormal temperature rise occurs in the first inverter and the second inverter, the control unit decreases an output of the first inverter and an output of the second inverter at different rates corresponding to different degrees of temperature rise.

11. The electric motor drive device according to claim 3, wherein if an abnormality occurs in at least one of a first current sensor that measures an output current of the first inverter and a second current sensor that measures an output current of the second inverter, the control unit decreases an output of the inverter the current sensor of which suffers from the abnormality while keeping or increasing an output of the other inverter the current sensor of which normally operates.

12. The electric motor drive device according to claim 8, wherein the output ratio correcting unit integrates values of at least one of the d-axis current and the q-axis current, which are converted by the three-to-two phase converting unit, for each inverter, and changes the output voltage ratio according to the integrated value.

13. A control method for an electric motor drive device provided with a first drive system including a first inverter and a second drive system including a second inverter, both of which supply power to one electric motor, the control method comprising the steps of:
- initiating diagnoses on the first drive system and the second drive system, respectively under such conditions that outputs from the first and second inverters are shut down, before startup of the electric motor,
- if the first drive system has completed its diagnosis ahead of the second drive system and found to be normal, increasing the output of the first inverter ahead of the second inverter, and then, if the second drive system has completed its diagnosis and found to be normal, increasing the output of the second inverter after the output of the first inverter is increased up to a set value, and
- if the second drive system has completed its diagnosis ahead of the first drive system and found to be normal, increasing the output of the second inverter ahead of the first inverter, and then, if the first drive system has completed its diagnosis and found to be normal, increasing the output of the first inverter after the output of the second inverter is increased up to a set value.

* * * * *